Nov. 3, 1936.     H. H. BELL     2,059,622

EXTRACTION APPARATUS FOR PRODUCTION OF BEVERAGES

Filed June 24, 1935

Hayes Hayden Bell,
INVENTOR

Patented Nov. 3, 1936

2,059,622

UNITED STATES PATENT OFFICE 2,059,622

EXTRACTION APPARATUS FOR PRODUCTION OF BEVERAGES

Hayes Hayden Bell, Terre Haute, Ind., assignor of one-half to Henry G. Schroer, Terre Haute, Ind.

Application June 24, 1935, Serial No. 28,119

3 Claims. (Cl. 53—3)

My invention relates to an improved extraction apparatus for the production of beverages. More specifically my invention relates to an extraction apparatus for coffee making which is particularly adapted for the production of a beverage which retains all of the original aromatic properties of the coffee.

Numerous types of devices for coffee making have been recommended in the past, but those which have met with any practical success have had the serious disadvantage that a considerable amount of the aroma of the coffee escapes during the extraction process. The devices commonly in use have had further disadvantages inherent in their operating procedures, particularly in that the extracting mass is boiled, which increases the loss of the aromatic properties, or else a troublesome filtration step is resorted to.

One object of my invention, therefore, is to provide a coffee extraction apparatus which will retain all of the aromatic properties of the coffee in the resulting extract. Another object is to provide an apparatus which may be successfully operated without the necessity of boiling the extracting mass or subjecting the resulting extract to filtration. A further object is the provision of an apparatus which is simple to operate and requires practically no attention after the preliminary admixture of the ground coffee and water. Other objects and advantages of my invention will be evident from the following description.

My improved apparatus comprises, basically, an extraction vessel having in its lower portion a receiver for extracted grounds, being provided with suitable heating means, and fitted with a special closure which is adapted to form a liquid seal with the extracting mass and to provide stirring means which may be operated without removing the closure from the extraction vessel. This apparatus will be described in greater detail with reference to the particular modification illustrated in the accompanying drawing.

Figure 3:
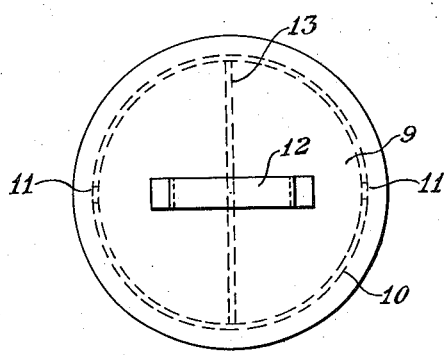
Figure 1:
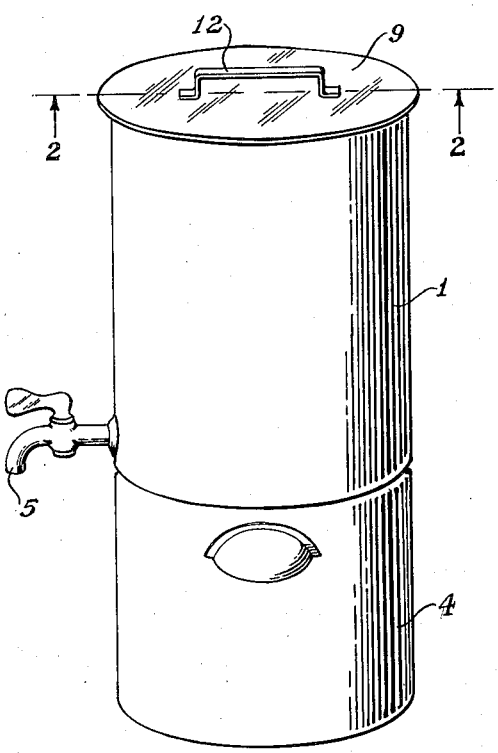
Figure 2:
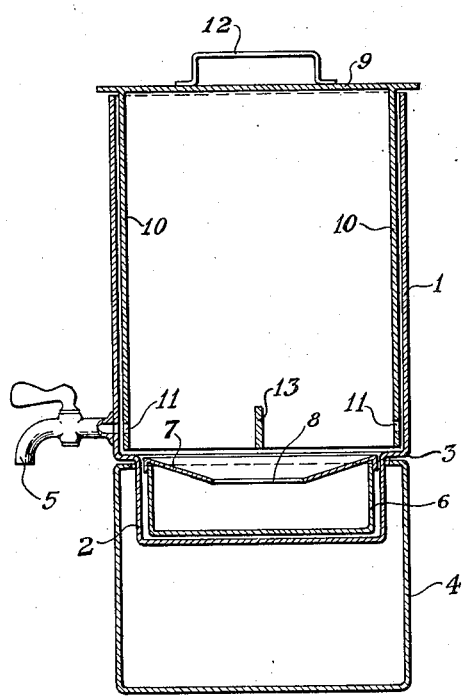
Figure 4:
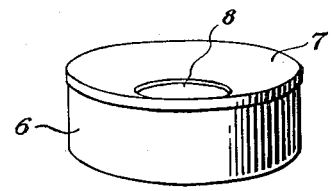

In the drawing, Fig. 1 represents a perspective view of the complete apparatus; Fig. 2, a cross section through the plane 2—2' of Fig. 1; Fig. 3, a top view of the special closure; and Fig. 4, a perspective view of the grounds receiver.

In the modification illustrated, the extraction chamber comprises a cylindrical vessel 1, having a constricted lower portion 2 providing a shoulder 3 adapted to rest on the rim of a heating vessel 4 according to the conventional construction of double-boilers. The extraction vessel is provided with means 5 for withdrawing extract from a point above and preferably adjacent the shoulder 3. Such means may constitute a spigot, as illustrated, or any other suitable device such as a conventional spout or the like. The lower portion of the extraction chamber contains the grounds receiver, which preferably consists of a small cylindrical cup 6 adapted to fit closely within the constricted portion 2 of the extraction vessel, and fitted with a closure 7 of inverted conical form having a central opening 8 or other suitable means for receiving settled grounds and retaining the same on angular displacement of the receiver in moving the apparatus, pouring from a spout, or the like.

The special closure for the extraction vessel comprises a conventional flanged cover 9 having the usual annular fitting-ring extended downwardly to form a skirt 10 of sufficient depth to insure a liquid seal with the extracting mass in the vessel 1. The skirt 10 preferably fits within the side walls of the vessel 1 with minimum clearance, and extends downwardly to the shoulder 3. The lower portion of this skirt may be provided with openings 11, adapted to register with the opening of the spigot 5 on rotation of the closure. These openings may suitably be aligned with the handle 12, as shown in Fig. 3, to enable accurate register to be secured while the closure is in place. A stirring device 13, which may comprise a vertical baffle plate as shown in the drawing, or any equivalent structure, is fitted to the inner walls of the skirt 10 at the lower portion thereof, preferably being positioned adjacent the top 7 of the grounds receiver and adapted to rotate thereover upon rotation of the closure.

In the preferred method of operation of my apparatus a suitable amount of boiling water is placed in the heating vessel 4 and the extraction vessel 1 fitted into place, the grounds receiver 6 being in position in the constricted portion 2 of the vessel. The required amount of finely pulverized coffee and boiling water are then placed in the extraction vessel and the closure fitted into place. The water in vessel 4 is then boiled for the desired heating period, usually about 5 minutes, after which heating is discontinued and the apparatus is preferably removed from any source of residual heat. At this point the closure 9 is rotated by means of the handle 12, and a whirling motion is imparted to the extracting mass by the stirring device 13. On standing for a short time the extracted grounds, aided by the whirling motion of the mass, settle through the opening 8 into the receiver 6. Clear extract may then be withdrawn from the spigot 5 after alignment of the openings 11 with the opening of the spigot.

It will be evident to one skilled in the art that the operation of my apparatus can be facilitated by the provision of a vent or valve (not illustrated in the drawing) positioned in the cover 9 and adapted for manual opening or closing. The lowering of the skirt 10 into the liquid can be facilitated by opening such vent or valve which should then be closed until the extraction is complete and the liquid is to be removed from the vessel.

The operation of my apparatus may also be successfully effected by starting with cold water in both the heating vessel and the extraction vessel. In this case a heating period of about 15 minutes will usually be required. Other modifications of the operating procedure will also be apparent to one skilled in the art. In any case, the length of the heating period, as well as the proportion of coffee to water, will be determined to some extent by individual taste. The degree of comminution of the coffee may also be varied, although it should preferably be as fine as possible, consistent with securing a clear extract after settling. A more coarsely ground coffee will, of course, require a somewhat longer heating period to secure a beverage of satisfactory strength.

It will be apparent that the mode of operation provided by my improved apparatus has many advantages over previous devices. The aromatic constituents of the beverage are sealed in the apparatus by the special closure employed, and the extracting mass is not exposed to the atmosphere from the time the materials are introduced until the finished beverage is removed. By thus conserving the aromatic properties, and by employing very finely ground coffee, a beverage of satisfactory strength may be prepared from a smaller quantity of coffee per cup than is usually employed with other devices. A further advantage of my apparatus consists in the fact that practically no attention is required for its operation. There is no danger of "boiling over", no difficult filtration to be accomplished, and no critical time for completing the operation. My apparatus is also advantageous from the standpoint that after removal from the heat the beverage will remain hot and palatable for considerable periods of time, due to the heating provided by the lower vessel and the fact that the extracted grounds are held in the receiver out of active contact with the extract. Various other advantages of my apparatus will be apparent from the preceding description.

It is to be distinctly understood, of course, that my invention is not to be limited to the particular modification described above by way of illustration. Numerous equivalents for the elements of the illustrated device will readily suggest themselves to those skilled in the art. As has been previously pointed out, a conventional spout or other draw-off means may be substituted for the spigot shown. Likewise, other means for receiving and retaining the extracted grounds may be substituted for the particular device specified above. For example, the lower portion of the extraction vessel may itself serve as the grounds receiver, especially if fitted with suitable baffles to retain the grounds on angular displacement of the vessel from its normal vertical position. Also, any other suitable stirring device, such as a series of inwardly extending radial baffles, may be substituted for the single plate shown. Other heating means may, likewise, be substituted for the double-boiler type steam jacket illustrated. However, such means should preferably heat the extracting mass only to a point somewhat below boiling, and not permit actual boiling to take place. In general, it may be said that any modifications or equivalents which would naturally occur to those skilled in the art may be employed without departing from the scope of my invention.

My invention now having been described, what I claim is:

1. In an extraction apparatus adapted for the production of beverages without the loss of aromatic constituents, the combination of an extraction vessel having in the lower portion thereof an imperforate receptacle for receiving and retaining settled solids, a closure for said vessel having a downwardly extending skirt adapted to fit within the side walls of said vessel with minimum clearance therefrom and adapted to extend below the normal liquid level in said vessel, and stirring means disposed on the inner wall of said skirt at the lower portion thereof, said stirring means being adapted to be operated by rotation of the said closure and being adapted to rotate above the level of the said receptacle for settled solids.

2. In an extraction apparatus adapted for the production of beverages without the loss of aromatic constituents, the combination of an extraction vessel, a receptacle adapted for receiving and retaining settled solids, positioned in the lower portion of said extraction vessel, means for withdrawing liquid from said extraction vessel at a point above and adjacent said solids receptacle, a closure for said extraction vessel having a downwardly extending skirt adapted to fit within the side walls of said vessel with minimum clearance therefrom, stirring means disposed on the inner wall of said skirt at the lower portion thereof, said stirring means being adapted to be operated by rotation of the said closure, openings positioned in the side walls of the said skirt at the lower portion thereof and adapted to be registered with the said means for withdrawing liquid, and heating means for the said extraction vessel.

3. In an extraction apparatus adapted for the production of beverages without the loss of aromatic constituents, the combination of a vertically positioned cylindrical extraction vessel having a constricted lower portion defining a shoulder in the side walls thereof, means for withdrawing liquid from said vessel at a point above and adjacent said shoulder, a closure for said extraction vessel having a downwardly extending skirt adapted to fit within the side walls of said vessel with minimum clearance therefrom and to extend downwardly to said shoulder, a vertical baffle plate positioned within the lower portion of said skirt and disposed approximately diametrically thereto, openings positioned in the side walls of the said skirt at the lower portion thereof and adapted to be registered with the said means for withdrawing liquid by rotation of the said closure, a cylindrical receptacle fitted with a downwardly extending conical closure having a central opening therein, the said receptacle being adapted to fit within the constricted lower portion of the extraction vessel, and a heating vessel adapted to provide a steam jacket surrounding the said constricted lower portion of the extraction vessel.

HAYES HAYDEN BELL.